(12) United States Patent
Caruso et al.

(10) Patent No.: US 11,030,670 B2
(45) Date of Patent: Jun. 8, 2021

(54) ANALYZING USER BEHAVIOR AT KIOSKS TO IDENTIFY RECOMMENDED PRODUCTS

(71) Applicant: PPG Industries Ohio, Inc., Cleveland, OH (US)

(72) Inventors: Christopher Caruso, Pittsburgh, PA (US); Kevan M. Farley, Monroeville, PA (US); Phillip J. Behrens, McDonald, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 452 days.

(21) Appl. No.: 15/575,528

(22) PCT Filed: May 19, 2016

(86) PCT No.: PCT/US2016/033327
§ 371 (c)(1),
(2) Date: Nov. 20, 2017

(87) PCT Pub. No.: WO2016/191212
PCT Pub. Date: Dec. 1, 2016

(65) Prior Publication Data
US 2018/0137553 A1    May 17, 2018

Related U.S. Application Data

(60) Provisional application No. 62/165,725, filed on May 22, 2015.

(51) Int. Cl.
*G06Q 30/06* (2012.01)
*G06Q 30/02* (2012.01)

(52) U.S. Cl.
CPC ......... *G06Q 30/0631* (2013.01); *G06Q 30/02* (2013.01); *G06Q 30/0621* (2013.01)

(58) Field of Classification Search
CPC ......... G06Q 30/02; G06Q 30/06–0645; G06Q 30/08; G06Q 50/01
See application file for complete search history.

(56) References Cited

U.S. PATENT DOCUMENTS

| 5,153,825 A | 10/1992 | Yauk et al. |
| 5,537,228 A | 7/1996 | Dillinger |

(Continued)

FOREIGN PATENT DOCUMENTS

| CA | 2544778 | 5/2005 |
| EP | 0484564 | 5/1992 |

(Continued)

OTHER PUBLICATIONS

International Search Report and Written Opinion for application No. PCT/US2016/033309 dated Jul. 20, 2016.

(Continued)

*Primary Examiner* — Adam L Levine
(74) *Attorney, Agent, or Firm* — Michael J. Frodsham

(57) ABSTRACT

The present invention is directed to determining products for a home project through a kiosk at a point of sale location corresponding to a retail establishment, and to determining products for a home project through a kiosk at a point of sale location corresponding to a retail establishment and based on a user's current or past behavior. In one scenario, a computer system receives user input including project information. The user input is converted into an electronic signal. The project information includes various user choices related to color profiles, and related to project materials or layout. The computer system determines a type of home project being pursued based on the received information. The computer system identifies products that correspond to the determined type of home project and received color profiles, and displays to the user images of the products that (Continued)

correspond to the determined type of home project and to the received color profiles.

19 Claims, 6 Drawing Sheets

(56) References Cited

U.S. PATENT DOCUMENTS

| | | | |
|---|---|---|---|
| 5,739,806 A | 4/1998 | Hissen et al. | |
| 5,761,392 A | 6/1998 | Yacoub et al. | |
| 6,014,221 A | 1/2000 | Plude, Jr. | |
| 6,122,391 A | 9/2000 | Ringland et al. | |
| 6,528,109 B1 | 3/2003 | Filev | |
| 6,563,510 B1 | 5/2003 | Rice et al. | |
| 6,628,829 B1 | 9/2003 | Chasen | |
| 6,717,584 B2 | 4/2004 | Kulczycka | |
| 6,727,925 B1 | 4/2004 | Bourdelais | |
| 6,772,151 B1 | 8/2004 | Johnston et al. | |
| 6,870,544 B2 | 3/2005 | Blanchard et al. | |
| 6,973,211 B2 | 12/2005 | McClanahan et al. | |
| 6,977,650 B2 | 12/2005 | Voye et al. | |
| 6,999,615 B2 | 2/2006 | McClanahan et al. | |
| 7,106,343 B1 | 9/2006 | Hickman | |
| 7,145,656 B2 | 12/2006 | Rodrigues et al. | |
| 7,187,386 B2 | 3/2007 | Rice et al. | |
| 7,193,632 B2 | 3/2007 | Rice et al. | |
| 7,230,629 B2* | 6/2007 | Reynolds | G06Q 30/0621 345/589 |
| 7,243,063 B2 | 7/2007 | McMullen et al. | |
| 7,249,063 B2* | 7/2007 | McMullen | G06Q 30/02 705/26.44 |
| 7,277,572 B2 | 10/2007 | MacInnes et al. | |
| 7,330,585 B2 | 2/2008 | Rice et al. | |
| 7,337,162 B2 | 2/2008 | Lewis | |
| 7,466,415 B2 | 12/2008 | Gibson et al. | |
| 7,474,314 B2 | 1/2009 | Minchew et al. | |
| 7,605,824 B2 | 10/2009 | Reynolds et al. | |
| 7,743,055 B2 | 6/2010 | Rodrigues et al. | |
| 7,859,545 B2 | 12/2010 | Tokunaga | |
| 7,999,825 B2* | 8/2011 | Webb | G01J 3/02 345/594 |
| 8,319,788 B2 | 11/2012 | Buzyn et al. | |
| 8,427,498 B2 | 4/2013 | Ou et al. | |
| 9,633,448 B1 | 4/2017 | Dorner | |
| 2001/0034668 A1 | 10/2001 | Whitworth | |
| 2001/0041966 A1 | 11/2001 | Corrigan et al. | |
| 2003/0216972 A1 | 11/2003 | Gotou et al. | |
| 2004/0093112 A1 | 5/2004 | Marchand et al. | |
| 2004/0267596 A1 | 12/2004 | Lind | |
| 2005/0099630 A1 | 5/2005 | Reynolds | |
| 2006/0001677 A1 | 1/2006 | Webb | |
| 2006/0210153 A1 | 9/2006 | Sara | |
| 2007/0018906 A1* | 1/2007 | Visnovsky | G01J 3/46 345/1.1 |
| 2007/0032965 A1 | 2/2007 | McClanahan et al. | |
| 2008/0299521 A1 | 12/2008 | Taylor et al. | |
| 2008/0305241 A1 | 12/2008 | Trevino et al. | |
| 2009/0183122 A1 | 7/2009 | Webb et al. | |
| 2009/0248199 A1 | 10/2009 | Milhorn | |
| 2009/0274827 A1 | 11/2009 | PaAnderson et al. | |
| 2009/0295823 A1 | 12/2009 | Henry | |
| 2010/0033318 A1 | 2/2010 | Tampke | |
| 2010/0094681 A1 | 4/2010 | Almen et al. | |
| 2010/0169336 A1 | 7/2010 | Eckhoff-Hornback | |
| 2010/0194776 A1 | 8/2010 | Chong et al. | |
| 2010/0228511 A1 | 9/2010 | Chin et al. | |
| 2010/0235400 A1 | 9/2010 | Myers et al. | |
| 2010/0262551 A1 | 10/2010 | Caruso | |
| 2011/0145051 A1* | 6/2011 | Paradise | G06Q 30/0623 705/14.25 |
| 2011/0170770 A1 | 7/2011 | Remedios | |
| 2011/0208565 A1 | 8/2011 | Ross et al. | |
| 2012/0123583 A1 | 5/2012 | Hazen et al. | |
| 2012/0170836 A1 | 7/2012 | Henry et al. | |
| 2012/0219699 A1 | 8/2012 | Pettersson et al. | |
| 2013/0215116 A1 | 8/2013 | Siddique | |
| 2013/0300761 A1 | 11/2013 | Ahmed | |
| 2014/0164913 A1 | 6/2014 | Jaros et al. | |
| 2014/0174595 A1 | 6/2014 | Millhorn | |
| 2014/0289069 A1* | 9/2014 | Bhardwaj | G06K 9/4604 705/26.7 |
| 2015/0235389 A1* | 8/2015 | Miller | G06Q 30/0627 345/594 |
| 2016/0307151 A1 | 10/2016 | Grabovski et al. | |
| 2018/0158123 A1 | 6/2018 | Caruso et al. | |
| 2018/0158124 A1 | 6/2018 | Caruso et al. | |

FOREIGN PATENT DOCUMENTS

| | | |
|---|---|---|
| EP | 0915401 A2 | 5/1999 |
| JP | 2001-209784 A | 8/2001 |
| JP | 2002-230083 A | 8/2002 |
| JP | 2003-016150 A | 1/2003 |
| JP | 2003-108865 A | 4/2003 |
| JP | 2006-504969 A | 2/2006 |
| JP | 2014-510322 A | 4/2014 |
| WO | 92/20024 A1 | 11/1992 |
| WO | 0213136 | 2/2002 |
| WO | 2004/042336 A1 | 5/2004 |
| WO | 2009/009745 A1 | 1/2009 |
| WO | 2009120527 | 10/2009 |
| WO | 2011089094 | 7/2011 |
| WO | 2013092677 | 6/2013 |
| WO | 2016/172316 A1 | 10/2016 |

OTHER PUBLICATIONS

International Search Report and Written Opinion for application No. PCT/US2016/033289 dated Jul. 19, 2016.
International Search Report and Written Opinion for application No. PCT/US2016/033260 dated Aug. 31, 2016.
Non-Final Office Action for application No. 15/575,431 dated Jan. 15, 2018.
International Search Report and Written Opinion for application No. PCT/US2016/033309, dated Jan. 12, 2016.
International Preliminary Report on Patentability for PCT/US2016/033309 dated Nov. 28, 2017.
International Preliminary Report on Patentability for PCT/US2016/033327 dated Nov. 28, 2017.
International Preliminary Report on Patentability for PCT/US2016/033289 dated Nov. 28, 2017.
International Preliminary Report on Patentability for PCT/US2016/033260 dated Nov. 28, 2017.
Examiner Requisition for CA 02986454 dated Jul. 24, 2018.
Examiner Requisition for CA 02986454 dated Jul. 4, 2018.
Examiner Requisition for CA 02986457 dated Jul. 24, 2018.
Examiner Requisition for CA 02986457 dated Jun. 26, 2019.
Examiner Requisition for CA 02986452 dated Jun. 18, 2019.
Examiner Requisition for CA 02986452 dated Jul. 23, 2018.
Examiner Requisition for CA 02986436 dated Sep. 4, 2018.
Examiner Requisition for CA 02986452 dated Aug. 7, 2019.
Office Action issued by European Patent Office for application No. 16728160.9-1217, dated Mar. 18, 2019.
Examiner Interview Summary Record (PTOL-413) received for U.S. Appl. No. 15/575,456, dated Oct. 9, 2020, 3 pages.
Final Office Action received for U.S. Appl. No. 15/575,456, dated Jun. 25, 2020, 46 pages.
Jay Joichi: "Imrpoving Color Exploration and Visualization on the ColorSmart by BEHR.TM. Application", Proceeding Dux '05 Proceedings of the 2005 Conference on Designing for User Experience Article No. 4, Jan. 1, 2005, retrieved from the internet: URL:http://delivery.acm.org/10.1145/1140000/1138240/a4-joichi.pdf?ip=145.-64.134.245&acc-ACTIVE.
Office Action for U.S. Appl. No. 15/575,474, dated Feb. 10, 2020.
Office Action received for Canadian Application No. 2986454, dated Jun. 3, 2020, 6 pages.
Office Action received for European Patent Application No. 16728159.1, dated Jun. 4, 2020, 5 pages.

(56) References Cited

OTHER PUBLICATIONS

Office Action received for European Patent Application No. 16728160.9, dated Jun. 15, 2020, 8 pages.
Reasons for Refusal for Japanese Patent Application JP2014-510322, dated Aug. 12, 2014.
European Office Action for EP Application 16721306.5, dated Dec. 18, 2020. (8 pages).
Kohrs, Amd, and Bernard Merialdo. "Using color and texture indexing to improve collaborative filtering of art paintings." Proc. Of European Workshop on CBMI. vol. 99. 1999. (Year: 1999).

* cited by examiner

ANALYZING USER BEHAVIOR AT KIOSKS TO IDENTIFY RECOMMENDED PRODUCTS

BACKGROUND

Many homeowners upgrade the look of their homes by doing home projects. In a majority of these projects, the homeowner paints one or more rooms. In particular, the walls, ceiling, doors, etc. can be earmarked for a new coat of paint. The homeowner may have a general idea of which colors to use, but often goes to a hardware or paint store to obtain paint swatches to identify colors they may be interested in using. These paint swatches may provide an indication of what various paint colors looks like when dry.

In some cases, these hardware or paint stores provide paint kiosks which usually house a variety of paint chips or color swatches for users to identify desired paint colors. The paint kiosks allow users to view different colors of paint and make determinations as to which colors of paint they would like to purchase. The paint kiosks may then assist the users in obtaining the paint in the color they have selected.

Oftentimes, when planning a home project, a user will want to determine not only a paint color for a given room, but will also want to identify complementary home décor items that go with the chosen paint color. Identifying matching home décor items may not be intuitive to some people. Moreover, there may be many different products offered by a retail establishment of which the user is simply not aware. As such, the user is unlikely to identify those products as being useful in completing their home project and, as a result is also unlikely to purchase those products from the retail establishment.

BRIEF SUMMARY

In the present invention, current or past behavior of a computer system receives user input that corresponds to project information. The user input is converted into an electronic signal. The project information includes various user choices related to color profiles, and related to project materials or layout. The computer system determines a type of home project being pursued based on the received information. The computer system identifies products that correspond to the determined type of home project and received color profiles, and displays to the user images of the products that correspond to the determined type of home project and to the received color profiles.

The present invention further describes a computer system that determines products for a home project at a point of sale location corresponding to a retail establishment and based on a user's current or past behavior. The computer system gathers current or past behavior information corresponding to a user and determines different types of behavior corresponding to the user's current or past behavior. The computer system further determines colors and/or products that correspond to the determined type of user behavior and displays to the user images of the colors and/or products that correspond to the determined type of user behavior.

The present invention also provides a kiosk computer system. The kiosk computer system includes at least one processor, a receiving module for receiving user input, where the user input corresponds to project information and where the user input is converted into an electronic signal. The project information includes user choices related to color profiles and to project materials or layout. The kiosk computer system further includes a project determining module for determining a type of home project being pursued based on the received information, a product identifying module for identifying products that correspond to the determined type of home project and received color profiles, and a display for displaying to the user images of the products that correspond to the determined type of home project and to the received color profiles.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of the present invention may be realized and obtained by means of the instruments and combinations particularly pointed out in the appended claims. Features of the present invention will become more fully apparent from the following description and appended claims.

BRIEF DESCRIPTION OF THE DRAWINGS

To further clarify the above and other features of the present invention, a more particular description will be rendered by reference to the appended drawings. It is appreciated that these drawings depict only examples of the present invention described herein and are therefore not to be considered limiting of its scope. The present invention and examples will be described and explained with additional specificity and detail through the use of the accompanying drawings in which.

DETAILED DESCRIPTION

Figure 1:
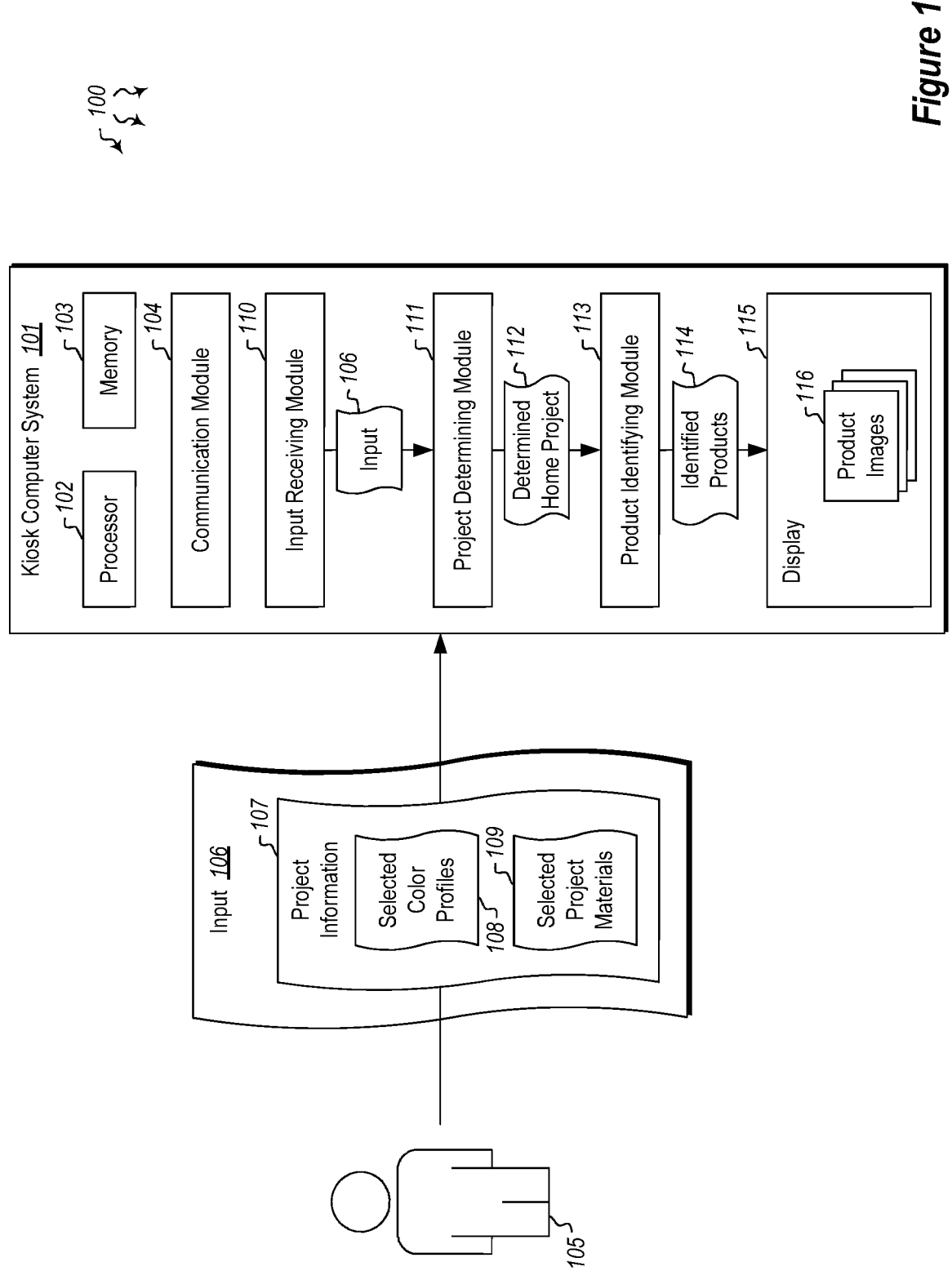
FIG. 1 illustrates a computer architecture in which the present invention may operate including determining products for a home project through a kiosk at a point of sale location corresponding to a retail establishment.

The present invention described herein is directed to determining products for a home project through a kiosk at a point of sale location corresponding to a retail establishment and to determining products for a home project through a kiosk at a point of sale location corresponding to a retail establishment and based on a user's current or past behavior. In one example, a computer system receives user input that corresponds to project information. The user input is converted into an electronic signal. The project information includes various user choices related to color profiles, and related to project materials or layout. The computer system determines a type of home project being pursued based on the received information. The computer system identifies products that correspond to the determined type of home project and received color profiles, and displays to the user images of the products that correspond to the determined type of home project and to the received color profiles.

In another example, a computer system determines products for a home project at a point of sale location corresponding to a retail establishment and based on a user's current or past behavior. The computer system gathers current or past behavior information corresponding to a user and determines different types of behavior or behavior patterns associated with the user's current or past behavior. The computer system further determines colors and/or products that correspond to the determined type of user behavior and displays to the user images of the colors and/or products that correspond to the determined type of user behavior.

In another example, a kiosk computer system is provided. The kiosk computer system includes at least one processor, a receiving module for receiving user input, where the user input corresponds to project information and where the user input is converted into an electronic signal. The project information includes user choices related to color profiles and to project materials or layout. The kiosk computer system further includes a project determining module for determining a type of home project being pursued based on the received information, a product identifying module for identifying products that correspond to the determined type of home project and received color profiles, and a display for displaying to the user images of the products that correspond to the determined type of home project and to the received color profiles.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

The present invention described herein may implement various types of computing systems, and may use these computing systems to perform computerized methods. These computing systems are now increasingly taking a wide variety of forms. Computing systems may, for example, be handheld devices such as smartphones or feature phones, appliances, laptop computers, tablets, wearable devices, desktop computers, mainframes, distributed computing systems, or even devices that have not conventionally been considered a computing system. In this description and in the claims, the term "computing system" is defined broadly as including any device or system (or combination thereof) that includes at least one physical and tangible hardware processor, and a physical and tangible hardware or firmware memory capable of having thereon computer-executable instructions that may be executed by the processor. A computing system may be distributed over a network environment and may include multiple constituent computing systems.

As illustrated in FIG. 1, a kiosk computing system 101 may include at least one processing unit 102 and memory 103. The memory 103 may be physical system memory, which may be volatile, non-volatile, or some combination of the two. The term "memory" may also be used herein to refer to non-volatile mass storage such as physical storage media or physical storage devices. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, the present invention is described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media or computer-readable hardware storage devices that form a computer program product. An example of such an operation involves the manipulation of data. The computer-executable instructions (and the manipulated data) may be stored in the memory 103 of the computing system 101. Kiosk computing system 101 may also contain communication channels that allow the computing system 101 to communicate with other message processors over a wired or wireless network. Such communication channels may include hardware-based receivers, transmitters or transceivers, which are configured to receive data, transmit data or perform both.

The present invention described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

The present invention described herein may also include physical and other computer-readable media for carrying or storing computer-executable instructions and/or data structures. Such computer-readable media can be any available media that can be accessed by a general-purpose or special-purpose computer system. Computer-readable media or storage devices that store computer-executable instructions and/or data structures are computer storage media or computer storage devices. Computer-readable media that carry computer-executable instructions and/or data structures are transmission media. Thus, by way of example, and not limitation, the invention described herein may comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the present invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The present invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the present invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which the present invention may be employed. Computer architecture 100 includes kiosk computer system 101 (or simply "kiosk 101" herein). Kiosk computer system 101 may be any type of local or distributed computer system, including a cloud computing system. The kiosk computer system 101 includes modules for performing a variety of different functions. For instance, the communications module 104 may be configured to communicate with other computing systems. The communications module 104 may include any wired or wireless communication means that can receive and/or transmit data to or from other computing systems. The communications module 104 may be configured to interact with databases, mobile computing devices (such as mobile phones or tablets), embedded or other types of computing systems.

The kiosk computer system 101 may further include an input receiving module 110. The input receiving module 110 may receive input 106 from a user 105. The input 106 may include project information 107, along with color profile selections 108 and project material selections 109. As the term is used herein, "project information" may refer to any type of data related to a specified home or business project. A home or business project may include remodeling, repainting, redecorating, adding or removing spaces or even building a new home or office. The project information may thus include materials, timelines, home décor objects including artwork or furniture, budget information or any other information related to a work that is to be performed on a house, office or other spaces including outdoor spaces.

Specifically, in some cases, the project information will be related to remodeling or repainting projects where a user (e.g. 105) is repainting one or more rooms and is using the kiosk computer system 101 to determine a paint color to use on a project, customize a paint color, color coordinate a paint color with other home décor items, or find home décor items that match a certain paint color. For instance, a user may be working on a bathroom repainting project. The user may then select items that are related to that bathroom project. The user can select the color for the bathroom on their own, or the kiosk computer system 101 can provide color suggestions. Once the color is selected, the user may be presented with various home décor items that correspond to the selected paint color. The kiosk computer system 101 may suggest home décor items that are similar to home décor previously purchased by the user or that correspond to purchases made by other users. The kiosk may then allow the user to purchase one or more of the presented home décor items. As such, the user may be able to select and purchase paint as well as corresponding home décor items.

The kiosk computer system 101 may thus receive user input 106 and apply that input to a specific task. The project determining module 111 may analyze the project information 107 received in the user input 106. The project information may specify one or more color profiles 108 that the user 105 would like to implement in a home project. For example, the user may wish to paint their living room, and may wish to implement two or three complementary colors. Thus, the user may have selected one or more color profiles 108 that are to be used when identifying products such as home décor items that would go along with the selected color profiles.

The user 105 may also have selected various project materials 109 that are to be used on the home project. These materials may include paints or stains, wallpaper, baseboards, carpeting, wood flooring, curtains, ceramic tile, cupboards, countertops, appliances, faucets or any other type of material or item that may be used in a home project. As the user determines which materials to select for a given room, the kiosk computer system 101 remembers the choices and user behavior for future purchases and future projects. Then, on future projects, the kiosk can present one or more of the material choices based on the past interaction. In some cases, the project information 107 may further include an indication of layout for some or all of the project materials. Thus, if the project is a kitchen remodel, the user 105 may provide some indication of how the materials are to be spaced or laid out in a given room. This layout information may assist the project determining module 111 in determining what type of project the user is attempting.

When the user interacts with the kiosk computer system 101, each of the user's interactions may be monitored, stored and/or analyzed. The kiosk computer system 101 may track what the user hovers the mouse (or their finger) over, what the user clicks on (or selects with their finger), what the user adds to a project, which pictures are viewed and for how long, etc. This user behavior may be stored and analyzed by the kiosk computer system 101 or may be transmitted to another (perhaps cloud) computing system.

In some cases, for example, items that are selected more frequently or are viewed more frequently or are viewed longer may be assigned a higher ranking, and may be shown more often to other users. This tracked user behavior can help the retail store to target specific ads or products to the end user or other end users based on the product or paint color's popularity. This also helps the retailer know what to purchase for inventory purposes. Still further, the kiosk computer system 101 may be tied to point-of sale transactions. As such, the kiosk can determine, base on point-of-sale transactions, which items are most often being purchased by customers. These purchased items may be categorized by project. The most popular items may then be suggested to other users while they are preparing their project on the kiosk. The retail store may thus use this behavior information as an analytical tool to continually improve the results shown to users.

Once the kiosk computer system 101 has determined a general or specific type of home project 112, the product identifying module 113 may use the determined home project to identify products that are available within a given retail establishment. The product identifying module 113 may be linked (e.g. via communications module 104) to, or may otherwise have access to, product information for a given store. The kiosk computer system 101 may thus be aware of which products are offered for sale at a given store, and may further be aware of which products are currently in stock at that store (or at other neighboring stores). The product identifying module 113 may thus be configured to identify products 114 that are currently in stock at a certain store, are in stock at a neighboring store, or which could be purchased at the store's website or through other channels.

The identified products 114 are related, in some fashion, to the determined home project 112. For instance, the project determining module 111 may determine, based on the user input 106, that the user 105 is either building a deck or a shed based on the selected project materials 109. The product identifying module 113 may then identify products that go along with a deck or shed, such as bracing brackets, nails, screws, windows, planter boxes, barbeques, roofing materials or other related items.

In cases where the user 105 provides a color profile 108, the identified products 114 may include separate paint colors for the sides of the shed and the door of the shed, or a separate color for shudders to place next to the windows in the shed, or roofing that color coordinates along with the colors for the shed walls. In another example, the project determining module 111 may determine that the project is a kitchen remodel. The product identifying module 113 may identify kitchen-related items that match or correspond with the selected color profiles 108 provided by the user, and are available for purchase in the store. Any products identified by module 113 may then be displayed in the kiosk display 115. These concepts will be explained further below with regard to methods 200 and 300 of FIGS. 2 and 3, respectively.

Figure 2:
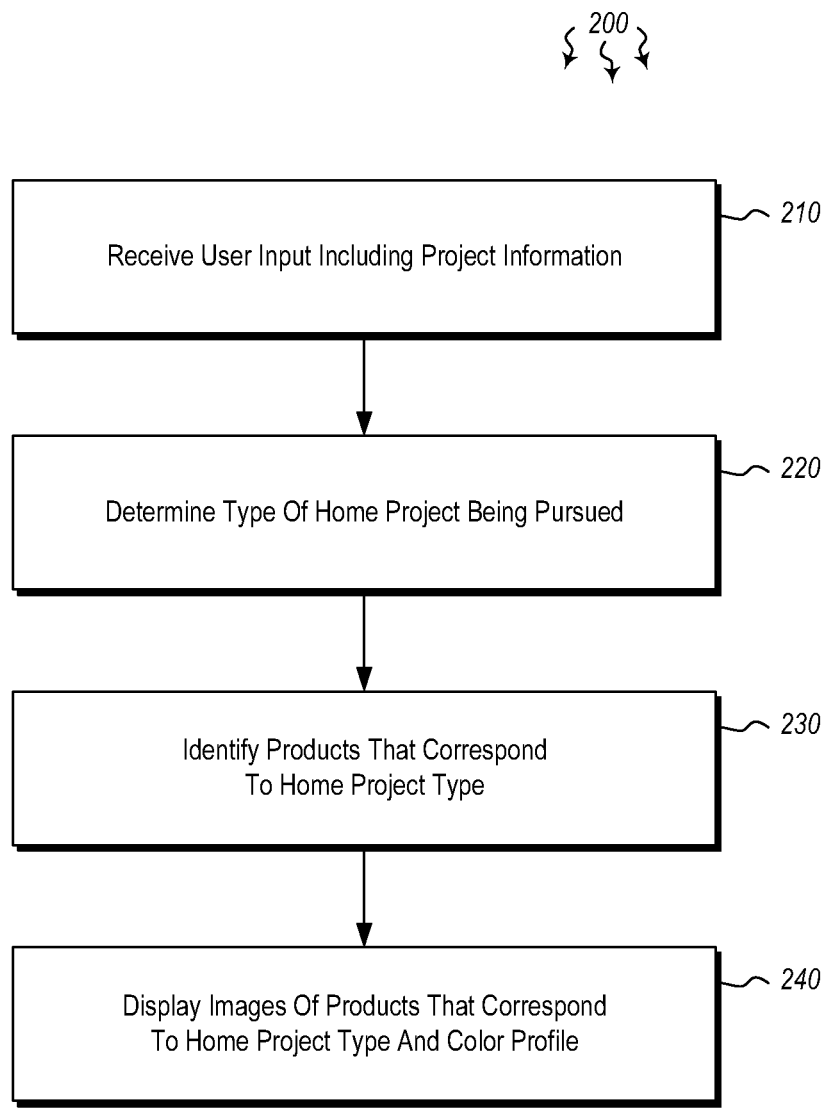
FIG. 2 illustrates a flowchart of an example method for determining products for a home project through a kiosk at a point of sale location corresponding to a retail establishment.
Figure 3:
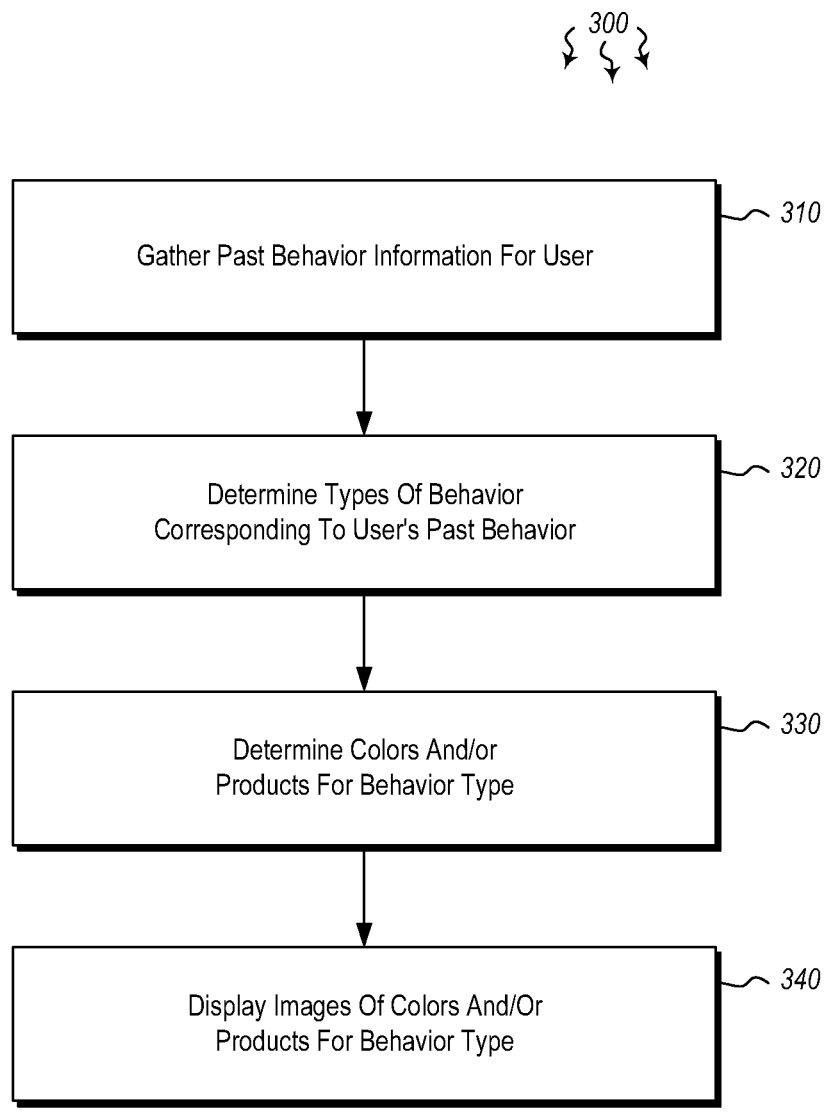
FIG. 3 illustrates a flowchart of an example method for determining products for a home project through a kiosk at a point of sale location corresponding to a retail establishment and based on a user's current or past behavior.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for determining products for a home project through a kiosk at a point of sale location corresponding to a retail establishment. The method 200 will now be described with frequent reference to the components and data of environment 100.

Method 200 includes receiving user input at the kiosk, the user input corresponding to project information, the user input being converted into an electronic signal, the project information including one or more user choices related to one or more color profiles, and one or more user choices related to project materials or layout (210). For example, the input receiving module 110 of kiosk computer system 101 may receive user input 106 from user 105. The user input 106 is converted to an electronic signal understood by the kiosk computer system 101. The user input may be a keyboard input, a mouse input, a touch input at a touchscreen, a data file or information provided by the user via a thumb drive or via a wireless data transfer (e.g. via Bluetooth), or other type of input. The user input 106 may include project information 107 which itself may include user choices related to color profiles 108 or to selected project materials 109 or project layout.

In some cases, the project information 107 may be accessed by the kiosk 101 from a home computing system belonging to the user. Additionally or alternatively, the project information 107 may be accessed from a user profile stored on a server or in the cloud. This user profile may contain purchase history, project history or other current or past behaviors associated with the user. Thus, the user 105 may select color combinations and/or materials for the project at home on their computer, and allow the kiosk computer system 101 to access those color and material selections from that home computer or from their stored user profile. The kiosk 101 may access the project information from a cloud computing system such as a cloud data store. In such cases, the user 105 may upload their project information 107 to a cloud data store, and then access that cloud data store using the kiosk 101, or perform steps that allow the kiosk to access the data in the user's cloud data store.

The kiosk may, for example, access the project information 107 from the cloud data store upon scanning a code provided by the user. Indeed, the kiosk 101 may include a code scanner that is capable of scanning bar codes, quick response (QR) codes or other types of codes. The QR code may include embedded information such as a link to the cloud data store and information identifying the user. The project information may also be input directly at the kiosk 101 using, for example, a mouse, a touch screen, a spectrophotometer that determines the color of a given item, or other input means. Accordingly, the project information 107 may be input directly by the user at the kiosk 101, or may be accessed from an external data source such as a thumb drive or cloud data store. Once the kiosk has this project information 107, the kiosk can retrieve and present paint colors or home decor items that correspond to the user's project. For example, if the user scanned in a blue lamp as part of the project, the kiosk 101 can display a room showing similar or complimentary complementary items to purchase.

Method 200 next includes determining, by the kiosk, a type of home project being pursued based on the received information (220). The project determining module 111 of the kiosk computer system 101 may determine the type of home project 112 being pursued by the user based on the project information 107. In some cases, the project information may provide information indicating the general nature of the project (e.g. master bedroom remodeling or redecorating), or may provide more specific information about the project.

In other cases, the project information 107 may only specify a paint color or a profile of paint colors that the user would like to use in the project. The input may also specify certain pieces of hardware or appliances or home décor items that the user would like to use in the project. In such cases, the project determining module 111 may look at the color profiles and the project materials and/or material layout, and may identify a specified home project 112. In some cases, the project determining module 111 may narrow down the projects to a few options, and may prompt the user for input to select which project they are actually working on. Thus, the user may confirm the accuracy (or identify the inaccuracy) in the determined home project 112.

Method 200 further includes identifying, by the kiosk, one or more products that correspond to the determined type of home project and received one or more color profiles (230). For example, the product identifying module 111 may identify products 114 that correspond to the determined type of home project 112 and the received color profiles 108. As indicated above, the product identifying module 113 may have access to a retail establishment's inventory, both in-store and online. The product identifying module 113 may thus examine a store's inventory to determine which products it has that would be useful in or complement a user's project.

For example, the store's inventory may indicate each item's color, or a plurality of colors if the item is available in more than one color. The product identifying module 113 may use this information to identify products that fit the selected color profile 108 or would color coordinate or match with the selected color or colors. These products may also be products that correspond to the determined home project. Thus, if the project is a new deck, or a new playground, woods, stains, nails, screws and other similar products may be identified, while if the project is a room remodel, or exterior façade remodel or basement build-out, products that are in-stock and available at that store and that relate to that specific project may be identified and displayed to the user on the kiosk.

In some cases, the home project information 107 may specify a particular room of the user's home. As such, the products that correspond to the determined type of home project correspond to the specified room. Indeed, many companies provide finishing products and home décor items that are designed for master bedrooms, bathrooms, living rooms, dens, boys' rooms, girls' rooms, babies' rooms, utility rooms, sun rooms, kitchens, outdoor living areas or other types of rooms or spaces. The kiosk 101 displays images 116 of the products that correspond to the determined type of home project and to the received one or more color profiles (240). The images are displayed on the display 115 of the kiosk, which may be a touchscreen or traditional digital or analog display.

Figure 5:
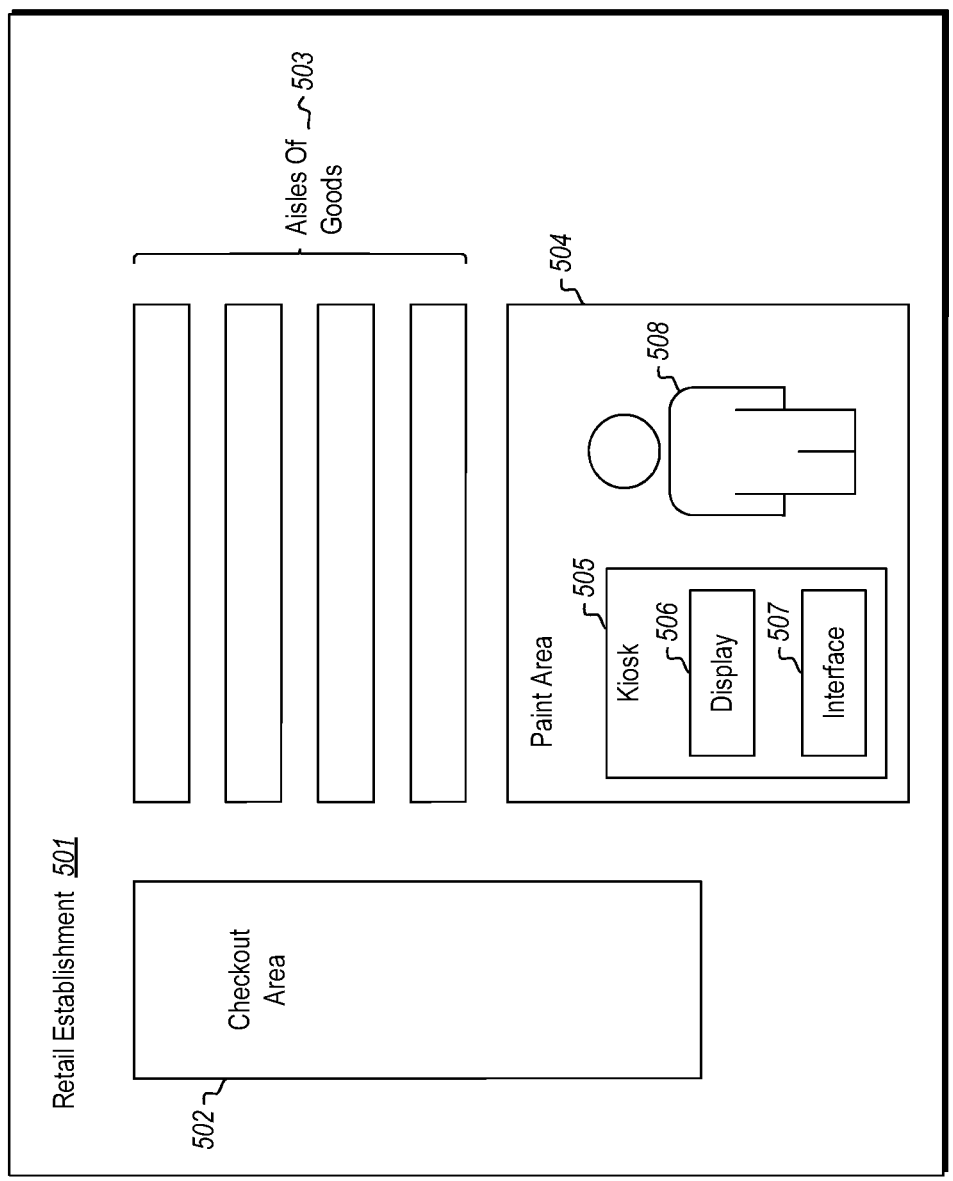
FIG. 5 illustrates an example of a retail establishment layout including paint area and kiosk.

Upon displaying these product images 116, the kiosk 101 may receive further user input selecting one or more of the displayed products. Once the user has selected a product's image, the kiosk may inform the user which of the selected products are available at the retail establishment, and may further indicate where the selected products are located at the retail establishment. For example, as shown in FIG. 5, retail establishment 501 may include multiple different areas including a checkout area 502, various aisles of goods 503 and a paint area 504 (among other areas not shown). The retail establishment may be a hardware store or home goods store or other type of retail establishment. The paint area 504 may be where the kiosk computer system 505 (e.g. kiosk 101 from FIG. 1) is located. The kiosk may include a display 506 and various user interface means 507 including a keyboard, mouse, touchscreen or other user interface hardware. The user 508 may use the kiosk 505 to perform various functions including determining products for a home project at the retail establishment 501, as is further shown in FIG. 6.

Figure 6:
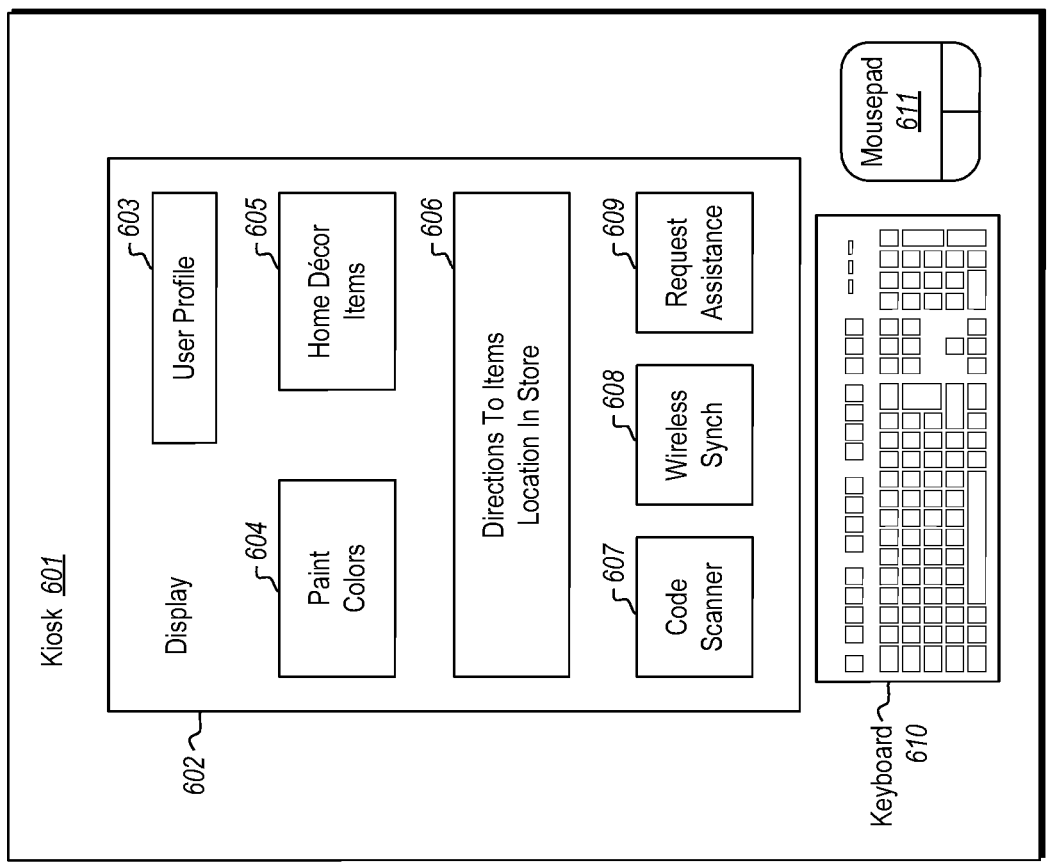
FIG. 6 illustrates an example of a kiosk that includes a display and user input devices.

One example of a kiosk is shown in FIG. 6. The kiosk 601 includes a display 602 that displays various project-related items. These items may include, among other things, directions to an item's location within the retail establishment 606. The directions may include an aisle number, a map showing where the specified aisle is located, a video showing directions to the product or other ways of locating the selected product(s) such as a pin on a digital map.

The kiosk 601 may further display paint colors 604 which may be the colors that are part of the selected color profiles 108. The kiosk 601 may also display home décor items 605. These may be the products 114 that were identified by the product identifying module as being color coordinated with the selected color profile 108, and as matching the identified home project 112. As mentioned previously, the kiosk 601 may also include a code scanner capable of scanning bar codes, QR codes or other types of codes. Using the code scanner, the user may input project information, or may provide indications of products which the user would like to use in their project (e.g. by scanning the product's bar code).

These identified products may then be color-matched to other products or project materials available for sale at the store or available online.

The kiosk 601 of FIG. 6 may further include a wireless synchronization feature 608 that allows users to upload images or other project information to the kiosk. The user may use a Bluetooth connection, for example, between their mobile device and the kiosk 601 to transfer images or other project information. The user may interact with the kiosk using keyboard 610, mouse pad 611 or may interact with the display 602 directly if the display is a touchscreen. The user input devices may allow the user to change settings, make selections, establish a link to a mobile device, scan codes or perform other tasks including requesting assistance. The kiosk 601 may display a request assistance 609 that, when selected, allows the kiosk user to request that a store personnel be notified of the user's interest in a selected product. The user may also use the user interface hardware to select and/or change their user profile 603.

The user profile 603 may include many different kinds of information about the kiosk user including the user's name, current project, past projects, color preferences or color profiles, product or brand name preferences or other information that may be linked to their profile including project information stored on a cloud data store. Thus, a user may log in at the kiosk 601 and select the user profile button 603 to access their user profile. This profile may list items purchased in the past, items in a wish list, items selected for a current project (including paint colors 604 and home décor items 605) or other project information. At least some portions of the project information may be stored in a cloud data store, and may be accessed on demand by the kiosk 601. This project information may be used to identify other products provided by the retail establishment that would match or correspond to a given project and/or color profile.

In this manner, the kiosk can identify products that are currently in-stock and available at the retail establishment, or are available to be shipped online. In some cases, the user may be shown directions to the products they have selected, or they may be guided to the location of the products by a store personnel who has been notified of the user's interest in that product, or may notify another entity that the selected products are to be automatically retrieved and given to the user.

Figure 4:
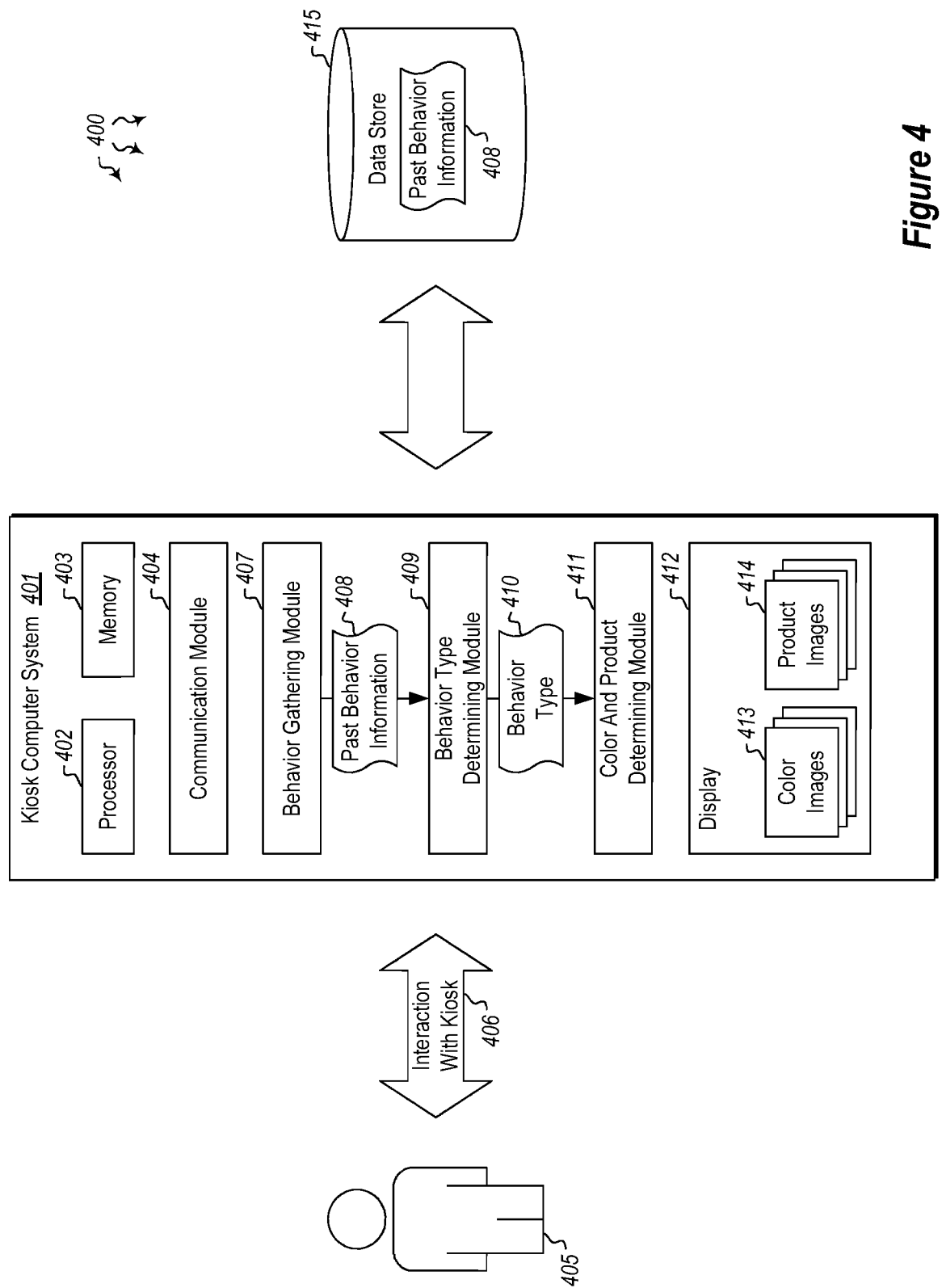
FIG. 4 illustrates an example in which products for a home project are determined through a kiosk at a point of sale location corresponding to a retail establishment and based on a user's current or past behavior.

Turning now to FIG. 3, a flowchart is illustrated of a method 300 for determining products for a home project through a kiosk at a point of sale location corresponding to a retail establishment and based on a user's current or past behavior. The method 300 will now be described with frequent reference to the components and data of environment 400 of FIG. 4 and the kiosk 601 of FIG. 6. As with the kiosk computer system 101 of FIG. 1, the kiosk computer system 401 of FIG. 4 includes a hardware processor 402 and memory 403. The kiosk 401 also includes a communications module 404 which may be configured to communicate with other computing systems (including other kiosks and users' mobile devices) via wired or wireless connections.

Method 300 includes gathering current or past behavior information corresponding to a user (310). For example, behavior gathering module 407 of kiosk computer system 401 may gather current or past behavior information 408 from various sources corresponding to user 405. The current or past behavior information 408 may, for example, be associated with a user's profile (e.g. 603 of FIG. 6). The current or past behavior information 408 may be stored on a local or remote data store 415. Indeed, while shown as being external to kiosk 401, the data store may be 415 internal or external to the kiosk. Moreover, the data store 415 may be local or distributed (e.g. a cloud data store).

The current or past behavior information 408 indicates how the user 405 has interacted with the kiosk in the past. Each time the user interacts with the kiosk 601 including interacting with the keyboard 610, mouse pad 611 or display 602, the kiosk may keep track of the user's interactions 406 and store them in the data store 415. The behavior information 408 associated with the user 405 may thus be based on multiple different kiosk interactions over time. The user's current or past behavior information may indicate a selection of paint colors, a selection of home décor products, a selection of appliances or other hardware, a selection of decorations, a preference for certain brands or types of products, an indication of past home projects, an indication of which products were ultimately purchased at the retail establishment or online, or other behavior information.

For instance, if a user makes an association between a color or color profile and a set of products, the kiosk computer system 101 may remember that association and potentially suggest it to other kiosk users. Products that are purchased most often may be suggested to the user according to their popularity, such that the most popular paint colors and home décor items are shown first. The list of popular items may be customized for the user, such that those items that are both popular and correspond to the user's project are shown to that specific user.

This past user behavior information 408 may be stored in a user profile account. Thus, as shown in FIG. 6, when a user logs in to or otherwise accesses the kiosk 601, the display 602 may include a user profile 603 that shows the various project information and current or past behavior information 408 associated with the user. The profile account 603 may be stored in a cloud computing system or cloud data store. As such, the user profile account is accessible by the kiosk 601 over the internet.

Method 300 further includes determining one or more types of behavior corresponding to the user's current or past behavior (320). The behavior type determining module 409 may determine a behavior type 410 based on the current or past behavior information 408 and the user's current interaction 406 with the kiosk. If the behavior is selecting paint or home décor items for a given home project, that behavior type 410 may be passed to the color and product determining module 411 for determining colors and/or products that correspond to the determined type of user behavior (330). The kiosk 601 then displays to the user images of the colors 604 and/or products 605 that correspond to the determined type 410 of user behavior (340).

The kiosk computer system 401/601 may, for example, receive user input 406 selecting one or more of products that were determined to correspond to the user's behavior type. Once the products have been selected, the kiosk may inform the user which of the selected products are available at the retail establishment, and may provide directions to the products within the store. As mentioned above, different kiosk users may make associations between products and colors or color profiles. These associations may be taken into account when recommending products to the user 405.

Thus, when the kiosk receives user input selecting one or more of displayed paint colors 604, for example, the kiosk may display images of products that correspond to the selected colors based (at least in part) on the product-to-color associations made by other kiosk users or suggestions based on other customer's behavior and/or feedback about a particular project or product. Still further, the kiosk may make associations between products, colors and behavior types. Many kiosks installed in a variety of different locations countrywide may receive user inputs, and each user's behavior may be monitored and tracked. This behavior may indicate certain product-to-color associations, or product-to-home-project associations or other behavioral associations that may be learned over time. These learned associations may be used to suggest products, paint colors, home décor items or even other home projects to users, based on what kiosks in that area or other areas have learned about users in that area or about users in general.

In one example, a kiosk or plurality of kiosks may provide behavior data to a central repository which identifies trends or new associations between products and colors or products and home projects. These trends may be confined to one geographic region, or may be countrywide or worldwide. Thus, the kiosks may be configured to display or otherwise suggest to the user associations that are popular in that area or region, or are trending that day, week, month or year. The kiosk may thus be continually updated to show the latest color recommendations or product recommendations based on a selected color or product.

The kiosk may then make determinations as to which of the products are currently in stock at the store and specifically suggest those products to the kiosk user. In this manner, kiosks worldwide may intercommunicate to learn user behaviors and behavior types, and learn from those behaviors which paint colors and products to suggest to users to provide the most helpful information to the user, and to assist the store in selling useful products to their customers.

Accordingly, methods, systems and computer program products are provided which determine products for a home project through a kiosk at a point of sale location corresponding to a retail establishment. Moreover, methods, systems and computer program products are provided which determine products for a home project through a kiosk at a point of sale location corresponding to a retail establishment and based on a user's current or past behavior.

As used in the specification, a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Furthermore, as used in the specification and appended claims, directional terms, such as "top," "bottom," "left," "right," "up," "down," "upper," "lower," "proximal," "distal" and the like are used herein solely to indicate relative directions and are not otherwise intended to limit the scope of the invention or claims.

In the drawings, like numerals designate like elements. Furthermore, multiple instances of an element may each include separate letters appended to the element number. For example two instances of a particular element "20" may be labeled as "20a" and "20b". In that case, the element label may be used without an appended letter (e.g., "20") to generally refer to every instance of the element; while the element label will include an appended letter (e.g., "20a") when referring to a specific instance of the element.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computerized method of determining products for a home project through a computerized kiosk at a point-of-sale location corresponding to a retail establishment, comprising:
   receiving user input at the kiosk, the user input corresponding to project information, the user input being converted into an electronic signal;
   wherein:
      the kiosk comprises a digital code scanner and a spectrophotometer; and
      receiving the user input comprises the kiosk digitally reading: (i) barcode data or a QR code data with the code scanner, and (ii) spectrophotometer data via the spectrophotometer;
   determining by the kiosk from the digital reading of (i) the barcode data, or the QR code data, and (ii) spectrophotometer data that the project information includes one or more user color choices, and one or more user choices of project materials;
   storing the one or more user color choices in connection with one or more color profiles for the user;
   retrieving a learned association corresponding to the determined one or more choices of project materials from a remote data store, wherein the learned association identifies a product-to-home-project association made by another end user at another kiosk at a different point-of-sale location;
   determining, by the kiosk using the code scanner data, the spectrophotometer data, and the learned association, a type of home project being pursued by the user;
   identifying, by the kiosk, one or more products that correspond to the determined type of home project and received one or more color choices; and
   displaying on a digital display of the kiosk images of the identified one or more products that correspond to (i) the determined type of home project, and (ii) the received one or more color choices.

2. The computerized method of claim 1, further comprising:
   receiving layout information from the user, wherein the layout information indicates how the determined one or more user choices of project materials are to be laid out in a given room; and
   the kiosk determining from the digitally read information and the received layout information that the home project information specifies a particular room of the home, such that the products that correspond to the determined type of home project correspond to the specified room.

3. The computerized method of claim 1, further comprising:
   receiving, by the kiosk, user input selecting one or more of the displayed products; and informing the user, by the kiosk, which of the selected products are available at the retail establishment.

4. The computerized method of claim 3, further comprising indicating, by the kiosk, where the selected products are located at the retail establishment.

5. The computerized method of claim 3, further comprising indicating, by the kiosk, to at least one personnel associated with the retail establishment the user's interest in the selected products.

6. The computerized method of claim 3, further comprising indicating, by the kiosk, to at least one other entity that the selected products are to be automatically retrieved.

7. The computerized method of claim 3, further comprising associating, by the kiosk, one or more products available at the retail establishment with one or more types of home projects.

8. The computerized method of claim 1, wherein the project information is accessed by the kiosk from a home computing system belonging to the user.

9. The computerized method of claim 1, wherein the project information is accessed by the kiosk from a cloud computing system.

10. The computerized method of claim 9, wherein the kiosk accesses the project information from the cloud computing system upon digitally scanning and interpreting a barcode presented to a barcode reader by the user.

11. A kiosk computer system comprising:
at least one processor;
a code scanner in the form of a barcode or a QR code scanning device, and a spectrophotometer;
an input receiving module for receiving user input via the code scanner and the spectrophotometer, the user input comprising presentation of a barcode or a QR code to the code scanner and presentation of a physical object to the spectrophotometer;
wherein the user input receiving module determines from data received from the code scanner and spectrophotometer that the user input corresponds to project information that includes one or more user color choices, and one or more user choices related to project materials and layout;
a behavior gathering module for gathering user behavior information from one or more remote data stores, wherein the one or more remote data stores comprise one or more learned associations that correlate user associations of one or more materials to one or more types of home projects;
a project determining module for determining a type of home project being pursued from the user input based on the received user input and one of the one or more learned associations retrieved from one of the one or more remote data stores;
a product identifying module for identifying one or more products that correspond to the determined type of home project and received one or more color profiles; and
a display for displaying on a digital display of the kiosk images of the one or more first suggested products that correspond to the determined type of home project and to the received one or more color profiles.

12. The kiosk computer system of claim 11, further comprising:
the input receiving module further receives user input selecting one or more of the products displayed in the display;
wherein the display displays information indicating which of the selected products are available at the retail establishment and where to find the selected products within the retail establishment.

13. The kiosk computer system of claim 11, further comprising:
a second remote kiosk in a geographic region of the user, wherein the second remote kiosk stores a second learned association of a second suggested product to home project type; and
a third remote kiosk outside the geographic region of the user, wherein the third remote kiosk stores a third learned association of a third suggested product to home project type.

14. The kiosk computer system of claim 13, wherein the kiosk that receives the user input further performs the following:
evaluate the learned association of the second and third remote kiosks by geographic region; and
display to the user the second suggested product based on a determination that the user is in the same geographic region as the second remote kiosk.

15. The kiosk computer system of claim 13, wherein the kiosk that receives the user input further performs the following:
evaluate the learned association of the second and third remote kiosks, and
display to the user the third suggested product based on a determination that the third learned association is more popular than the second learned association of the second remote kiosk.

16. A computerized method of determining a type of home project and corresponding product suggestions through a computerized kiosk at a point-of-sale location corresponding to a retail establishment, comprising:
providing a kiosk having a digital code scanner device, and a spectrophotometer connected thereto;
scanning, via the spectrophotometer, one or more project materials provided physically by an end user to the spectrophotometer;
receiving additional input from the end user at the kiosk, the user input comprising layout information of at least one of the scanned one or more project materials;
determining from the spectrophotometer one or more colors corresponding to the scanned project materials;
storing, on a remote data store, the determined one or more corresponding colors of project materials with a profile of the end user;
scanning one or more barcodes or QR codes on each of the one or more project materials via the digital code scanner device;
retrieving a learned association corresponding to the determined one or more choices of project materials from a remote data store, wherein the learned association identifies at least one product-to-home-project association made by another user at another kiosk;
determining, by the kiosk, from (i) the learned association, (ii) the determined one or more colors, (iii) the end user input on layout information, and (iv) data obtained from the digital code scanner device, that the one or more project materials correspond to a type of home project being pursued by the user;
determining, by the kiosk, one or more suggested products that correspond and are complementary to the determined type of home project and determined one or more colors; and
displaying on a digital display of the kiosk images of the one or more suggested products in a room, wherein the displayed room shows (i) products that correspond to the scanned one or more project materials, and (ii) the determined one or more complementary products to purchase.

17. The computerized method of claim 16, further comprising the kiosk displaying the one or more suggested products in an order that corresponds to a popularity of the one or more suggested products with other users.

18. The computerized method of claim 16, wherein the type of home project further comprises:
   the kiosk identifying a plurality of options of home project type based on the determined one or more colors and layout information; and
   prompting the user for input through the display to select one of the identified home project type options.

19. The computerized method of claim 16, wherein layout information comprises user input of a specified arrangement of a plurality of the following materials in a given room: flooring, appliances or faucets, countertops, and cupboards.

\* \* \* \* \*